UNITED STATES PATENT OFFICE.

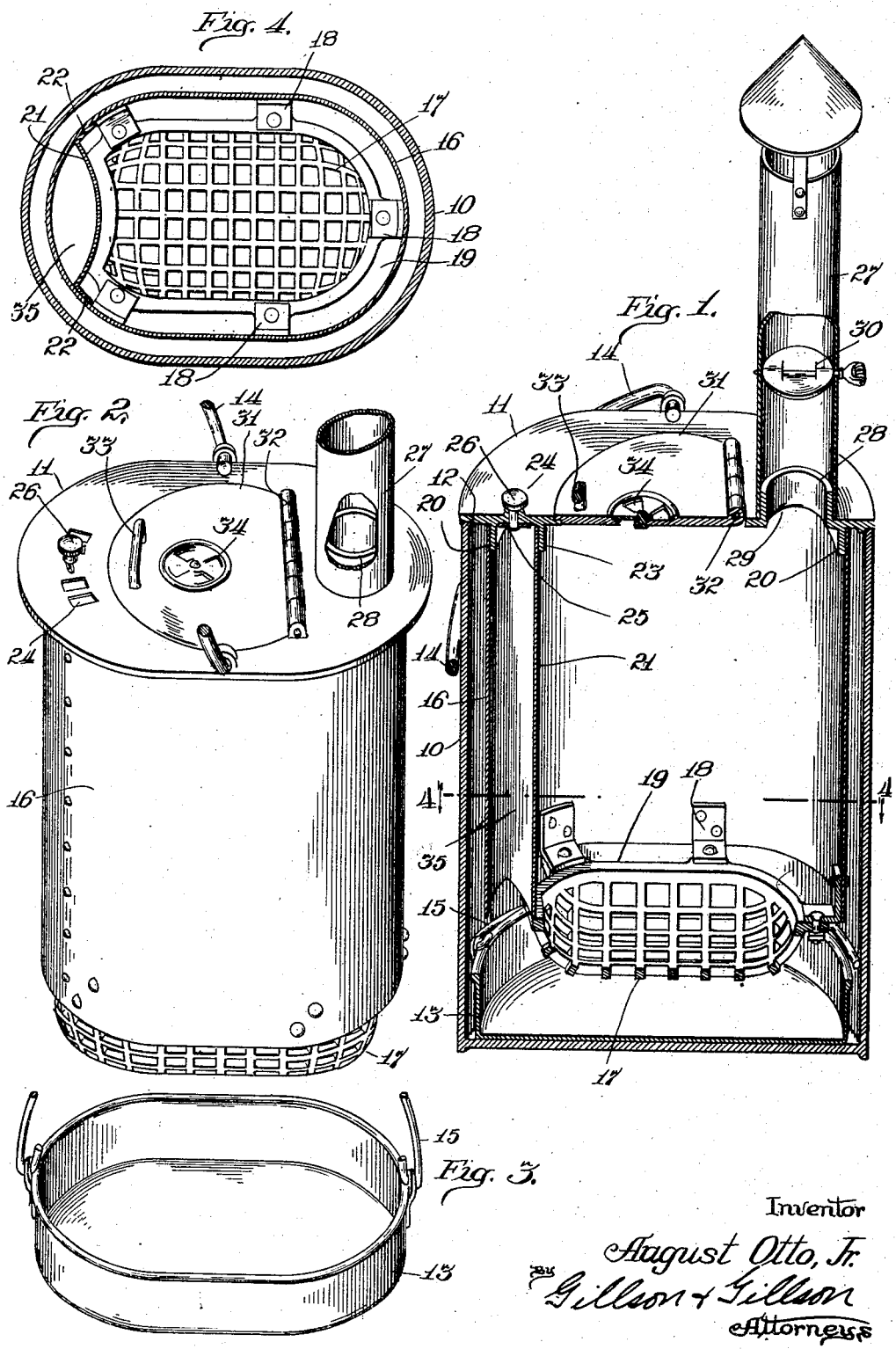

AUGUST OTTO, JR., OF SANDWICH, ILLINOIS.

TANK-HEATER.

1,309,101.  Specification of Letters Patent.  Patented July 8, 1919.

Application filed April 11, 1918. Serial No. 227,970.

*To all whom it may concern:*

Be it known that I, AUGUST OTTO, Jr., a citizen of the United States, and resident of Sandwich, county of Dekalb, State of Illinois, have invented certain new and useful Improvements in Tank-Heaters, of which the following is a specification and which are illustrated in the accompanying drawings, forming a part thereof.

The invention relates to a tank and water heater and more particularly to heaters of the type adapted to stand in the water to be heated and has for its object to simplify the construction and improve the operation of heaters of this type, especially in making adequate provision for cleaning the fire. To this end the invention contemplates a construction in which the fire pot is secured to the lid of the heater and may be readily lifted out of the casing for cleaning and other purposes. Other features of the invention will be described in connection with the construction shown in the accompanying drawings, in which:—

Figure 1 is a vertical sectional perspective view of a heater embodying the features of the present invention;

Fig. 2 is a perspective view showing the lid of the heater and the parts permanently connected thereto;

Fig. 3 is a perspective view of the ash pan, and

Fig. 4 is a horizontal section on the plane indicated by the line 4—4 on Fig. 1.

In the form of construction shown in the drawings the heater comprises a casing, as 10, of sufficient height to extend above the level of the water in the tank (not shown) to be heated when resting upon the bottom of the said tank. The casing 10 is normally closed at the top by a removable lid 11 which rests upon the top of the casing and is preferably formed upon its under side with a continuous bead 12 to fit within the upper edge of the casing and prevent lateral displacement of the lid.

In order to simplify the construction and operation of the heater all of the parts of the latter with the exception of the casing and an ash pan 13 may, to advantage, be attached to the lid. It therefore follows that when the lid is lifted by suitable means, as by a bail 14, these parts are all withdrawn from the casing. The ash pan may similarly be provided with a bail 15 to facilitate its removal.

The fire pot may consist of an imperforate sheet metal body 16 to the lower end of which is secured a fire grate 17 as by means of brackets 18 riveted to the body 16 and to the rim of the grate. Preferably the grate 17 is of smaller size than the body 16 whereby a space 19 is left around the grate through which a poker may be passed in cleaning the fire-pot, removing adhering clinkers and the like. The body 16, of the fire-pot may be conveniently attached to the lid 11 by means of a downwardly extending flange 20 formed integrally with the lid and entering the body of the fire-pot.

Air is preferably admitted to the space below the grate through a vertical air passage 35. As shown, this air passage is formed by the use of a plate 21 having lateral flanges 22 secured to the inner face of the body of the fire pot and attached at its upper end to a flange 23 on the under side of the lid. When the passage is so made, air inlet slots 24 are formed in the lid 11 in line with the passage and these slots are controlled by a sliding damper plate 25, adjustable by means of a knob 26.

The products of combustion are discharged through a smoke stack 27 which fits over an annular upstanding flange 28 on the lid 11 surrounding an aperture 29 in the latter. A damper 30 may be provided in the smoke stack for controlling the rate of combustion in the fire-pot. Fuel may be introduced through an opening in the lid normally closed by a cover 31 hinged to the lid at 32 and provided with a suitable handle, as 33.

As in some cases it may be desirable to admit air at the top of the fire-pot to avoid air being drawn through the latter as when it is desired to totally check the fire, a damper 34 of well known type may be arranged in the cover 31. It will be seen that under normal conditions of operation, air passes through the apertures 24 in the lid down the passage 35 to the space below the grate, then up through the grate and the bed of fuel thereabove and finally the products of combustion escape through the smoke stack 27. The air between the body 16 of the fire-pot and the casing 10 is not disturbed and so forms a dead air space which prevents undue cooling of the fire-pot and its contents. On the other hand, the body 16 of the fire-pot is preferably made of the same shape and only enough smaller than the casing 10 to permit of its being readily removed and replaced and the intervening air space is therefore relatively narrow.

The arrangement shown has the further advantage that the movement of the air from the time of its first contact with the fuel to its discharge as products of combustion into the atmosphere is always upward so that conditions are favorable for producing a draft through the heater which may be controlled as desired, by means of the dampers provided for the purpose.

When the fire is to be cleaned, the bail 14 is used for lifting the entire fire-pot from the casing 10 and resting it upon the ground. Upon raising the hinged cover 31, a poker may be introduced and the fire thoroughly cleaned even though a deep bed of coals may be contained in the fire pot. Under these circumstances there is no occasion to remove any of the fire or unburned coals from the fire-pot and the ash pan 13 is only required to receive so much of the ash as falls through the grate during the normal operation of the heater.

I claim as my invention:

1. A tank heater comprising, in combination, an upright outer casing having an open top and imperforate sides, a removable lid covering the entire top of the casing, said lid having air inlet and smoke flue openings, a relatively deep fire-pot having imperforate sides and a foraminous bottom and being spaced apart from the side and bottom walls of the casing so as to provide a dead air space between the firepot and the side walls of the casing, the smoke flue opening of the lid registering with the chamber of the fire-pot and the air inlet opening of the lid being located without the fire-pot, and a smoke stack carried by the lid.

2. In a water tank heater, in combination, an upright casing adapted to project above the water in the tank and being without perforations in the portion adapted to be submerged, a cover for the casing, a fire-pot depending from the cover, such pot being spaced from the walls of the casing and terminating above the bottom thereof, thereby providing an air space surrounding the fire-pot and open at the bottom and otherwise closed, a grate secured in the bottom of the fire-pot, an air induction port leading from the upper portion of the casing and discharging below the grate, and a smoke flue leading from the upper portion of the fire-pot.

3. In a water tank heater, in combination, an upright casing having a cover, a fire-pot within the casing and having a grated bottom located above the bottom of the casing, the walls of the fire-pot being spaced apart from the casing and forming therewith an air chamber open at the bottom and otherwise closed, an air induction passage leading to the lower portion of the casing and discharging below the grate, and a smoke flue leading from the fire-pot.

AUGUST OTTO, Jr.

Copies of this patent may be obtained for five cents each, by addressing the "Commissioner of Patents Washington, D. C."